(12) United States Patent
Zhang et al.

(10) Patent No.: US 8,412,667 B2
(45) Date of Patent: Apr. 2, 2013

(54) COMPARING AND IDENTIFYING SIMILAR TRACKS

(75) Inventors: Li Zhang, Sunnyvale, CA (US); Maya Haridasan, San Jose, CA (US); Chandramohan A. Thekkath, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 404 days.

(21) Appl. No.: 12/779,053

(22) Filed: May 13, 2010

(65) Prior Publication Data
US 2011/0282825 A1 Nov. 17, 2011

(51) Int. Cl.
*G06F 17/00* (2006.01)
*G06N 7/04* (2006.01)
(52) U.S. Cl. .......................................... 706/54
(58) Field of Classification Search .................. None
See application file for complete search history.

(56) References Cited

U.S. PATENT DOCUMENTS

| | | | |
|---|---|---|---|
| 6,505,118 B2 | 1/2003 | Chowanic et al. | |
| 6,584,401 B2 | 6/2003 | Kirshenbaum et al. | |
| 6,751,548 B2 | 6/2004 | Fox et al. | |
| 7,627,422 B2 | 12/2009 | Adamczyk et al. | |
| 2001/0056363 A1 | 12/2001 | Gantz et al. | |
| 2003/0100993 A1* | 5/2003 | Kirshenbaum et al. | 701/202 |
| 2004/0158483 A1 | 8/2004 | Lecouturier | |
| 2007/0276595 A1 | 11/2007 | Lewinson et al. | |
| 2008/0250357 A1 | 10/2008 | Lee et al. | |
| 2011/0125392 A1* | 5/2011 | Hao | 701/118 |

FOREIGN PATENT DOCUMENTS
WO 2009122236 A2 10/2009

OTHER PUBLICATIONS

Demmelhuber, et al., "Press Release High Oil Prices: All in the Hands of Ebay-Principle and Google Maps for Ride Sharing/Car Pools?", Retrieved at <<http://www.drijo.com/server/presse/pren.pdf>>, May 28, 2008, pp. 1.
Resnick, Paul., "SocioTechnical Support for Ride Sharing", Retrieved at <<http://presnick.people.si.umich.edu/papers/rideshare/draftscenario.pdf>>, 2003, pp. 1-5.

* cited by examiner

*Primary Examiner* — Kakali Chaki
*Assistant Examiner* — Luis Sitiriche
(74) *Attorney, Agent, or Firm* — Microsoft Corporation

(57) ABSTRACT

The location of a user over time is monitored by a mobile device. The monitored locations are organized into tracks that describe a path or route that the user took over a period of time. Segments that correspond to each of the tracks are determined. The segments may correspond to road on a map, or some other standardization. The segments are associated with their corresponding tracks, and used to identify similar tracks or to generate similarity scores for pairs of tracks.

15 Claims, 8 Drawing Sheets

COMPARING AND IDENTIFYING SIMILAR TRACKS

BACKGROUND

Current applications for mobile devices such as cell phones, and personal digital assistants make use of a user's current location. These applications may provide targeted advertisements based on a user's location (e.g., display a coupon for a coffee shop near the user's current location), or may alert the user to friends that may be nearby.

More sophisticated applications may make use of what is known as a track. A track is a set of location identifiers and temporal identifiers associated with a user. For example, a track may describe a user's commute or a favorite jogging route of the user.

However, while comparing a user's current location with sponsored locations for targeted advertising purposes, or comparing a user's current location with current locations of their friends is relatively simple, comparing tracks is more difficult. For example, because two users may walk on different sides of the street, have different speeds, or stop at one or more different locations than each other during an otherwise identical trip, the tracks describing each of their trips may be different.

SUMMARY

The location of a user over time is monitored by a mobile device such as a cellular phone. The monitored locations are organized into tracks that describe a path or route that the user took over a period of time. Segments that correspond to each of the tracks are determined. The segments may correspond to roads on a map, or some other canonicalization. The segments are associated with their corresponding tracks, and used to identify similar tracks or to generate similarity scores for pairs of tracks.

In an implementation, a plurality of tracks is received by a computing device. Each track includes a plurality of location identifiers. A plurality of segments is received by the computing device. For each track, one or more segments that correspond to the track are determined by the computing device. An identifier of a track is received by the computing device. One or more segments that correspond to the identified track are determined by the computing device. One or more tracks that are similar to the identified track based on the one or more segments that correspond to the identified track and the one or more segments that correspond to each of the tracks are determined by the computing device.

Implementations may include some or all of the following features. Each segment may correspond to a section of a road on a map. Determining one or more segments that correspond to the identified track may include placing each location identifier of the identified track on the map, and determining the sections of road that connect the placed location identifiers on the map. Each track may represent a commute. The identifier of a track may be received from a user and identifiers of the determined track(s) may be presented to the user. A node corresponding to each segment may be generated. Each node may be associated with the tracks that correspond to the segment of the node. Pairs of nodes that correspond to adjacent segments may be identified. For each identified pair of nodes, it may be determined if the pair of nodes are associated with at least one common track, and if so a node for the identified pair of nodes may be generated and the generated node may be associated with the tracks associated with the identified pair of nodes. A node that is in more than one identified node pair may be identified. The node pair that includes the identified node that has the greatest number of associated tracks may be determined. At least one node pair from the identified pairs of nodes that includes the identified node that does not have the greatest number of associated tracks may be removed.

In an implementation, an identifier of a first track and an identifier of a second track are received by a computing device. The first track and the second track each include location identifiers. A first plurality of segments associated with the first track is determined. A second plurality of segments associated with the second track is determined. A third plurality of segments is determined based on the first segments and the second segments. The third segments include segments that are in both the first plurality of segments and the second plurality of segments. A fourth plurality of segments is determined based on the first plurality of segments and the second plurality of segments. The fourth segments include segments that are in either the first plurality of segments or the second plurality of segments. A similarity score is determined for the first and second tracks based on the third plurality of segments and the fourth plurality of segments.

Implementations may include some or all of the following features. The generated similarity score may be provided to a user. A length of the segments in the third plurality of segments and a length of the segments in the fourth plurality of segments may be determined, and determining the similarity score may include determining a ratio between the length of the segments in the third plurality of segments and the length of the segments in the fourth plurality of segments. Each segment may correspond to a section of a road on a map. Determining the first segments associated with the first track may include placing each location identifier of the first track on the map, and determining the sections of road that connect the placed location identifiers on the map.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
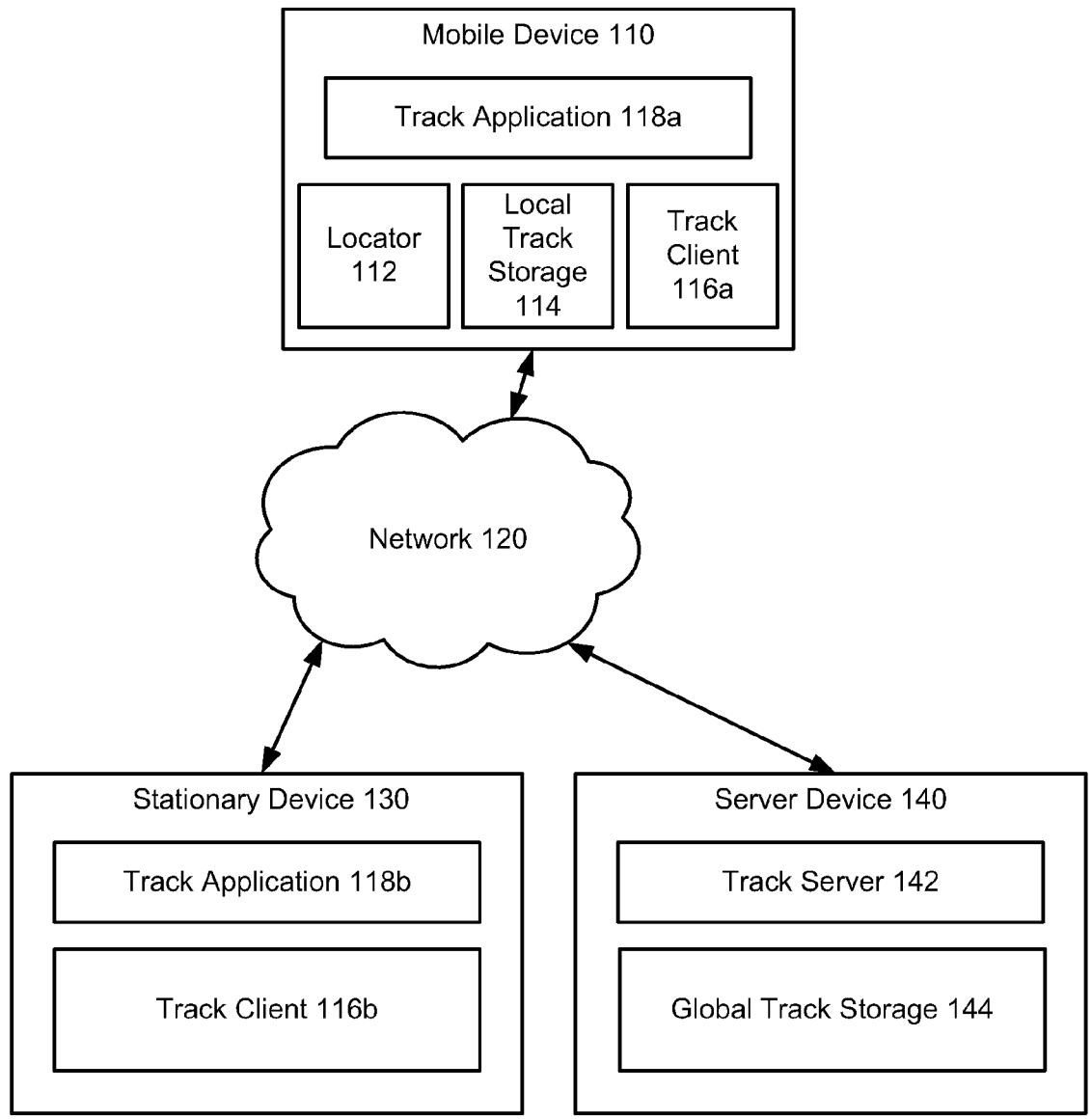
FIG. 1 is an illustration of an example environment for the determination of similar tracks.

FIG. 1 is an illustration of an example environment 100 for the determination of similar tracks. In some implementations, a track may comprise a set of location identifiers along with temporal identifiers that indicate times during which some or all of the location identifiers were determined. A track may also be associated with a user. The track may purport to represent a path or route that the associated user took. In some implementations, the location identifiers making up the track are collected by a mobile device 110 using a global positioning system (GPS).

As described above, the environment 100 may include a mobile device 110. The mobile device 110 may include a variety of mobile computer devices including, but not limited to, cellular phones, personal digital assistants, video game devices, audio and video players, watches, dongles, laptops, or any other type of computer device. The mobile device 110 may be any computer device that can be with the user while the user travels. Thus, the mobile device 110 may be a cellular phone that the user carries on their person, or a computer installed in a car that the user drives in. An example computer device is described with respect to the computing device 800 illustrated in FIG. 8, for example.

As illustrated, the mobile device 110 includes a locator 112. The locator 112 may be a component of the mobile device 110 that determines the location of the mobile device 110. In some implementations, the locator 112 may comprise a GPS device. Other types of devices may also be used. For example, the locator 112 may determine the location of the mobile device 110 using cellular phone signal information (e.g., distance from cellular towers), or Wi-Fi signal information (e.g., distance from Wi-Fi hotspots having a known location). Any system, method, or technique for determining a location may be used.

In some implementations, the locator 112 may periodically determine the location of the mobile device 110. The rate or frequency with which the locator 112 may determine the location of the mobile device 110 may vary depending on the type of mobile device 110 or the methods through which the locator 112 determines the location of the mobile device 110.

The locator 112 may store identifiers of location in a local track storage 114. The locator 112 may store the identifiers of location along with a temporal identifier of a time at which each identifier of a location is determined. In some implementations, the identifiers of location and temporal identifiers may be grouped together and stored as tracks. As described above, a track may comprise a set of identifiers of locations that represent a path taken by the mobile device 110. A track may have an identified beginning and ending location. The beginning and ending location of a track may be determined by a user of the mobile device 110, or automatically by the mobile device 110 based on time lapses between detected mobile device 110 movements. For example, if the mobile device 110 has not moved from an identified location in an hour (or other predetermined amount of time), the end of a track may be determined.

The environment 100 may further include a stationary device 130. The stationary device 130 may be similar to the mobile device 110, but may be lacking or may not have access to a locator 112. A user may use the stationary device 130 to view and organize tracks associated with the user, view tracks associated with other users, and perform various track related functions. The stationary device 130 may be implemented using a variety of computing devices including the computing device 800 described with respect to FIG. 8, for example.

The mobile device 110 may further include a track client 116*a*. The track client 116*a* may control the operation of the locator 112 and the local storage 114, interface with a track application 118*a* executing on the mobile device 110, and connect to a server device 140 and/or the stationary device 130 though a network 120. The network 120 may be a variety of network types including the public switched telephone network (PSTN), a cellular telephone network, and a packet switched network (e.g., the Internet). The stationary device 130 may similarly include a track client 116*b*. The track client 116*b* may interface with a track application 118*b* executing on the stationary device 130 through the network 120.

The track client 116*a* may interface with the track application 118*a* through an application programming interface (API). The track application 118*a* may incorporate tracks and track related features using the API. By using an API with the track client 116, a variety of applications 118*a* may incorporate track functionality. The track client 116*b* and track application 118*b* may perform similar functions on the stationary device 130.

The track clients 116*a* and 116*b* may communicate with a track server 142 executing on the server device 140. The server device 140 may be implemented on a variety of computing devices such as the computing device 800 illustrated in FIG. 8, for example. As will be described further below, the track server 142 may perform a variety of services and track related computations for the track clients 116*a* and 116*b*. Because the mobile device 110 may have limited storage and processing capabilities it may be desirable to perform such computations on the server device 140. However, there may be implementations where the mobile device 110 may perform some or all of the functions of the server device 140. Moreover, it is contemplated that multiple mobile devices 110 may together perform the functions of the server device 140 in a peer-to-peer or other type of distributed computing arrangement.

The track server 142 may receive one or more tracks from the track client 116*a*. The track client 116*a* may periodically upload tracks determined at the mobile device 110. In some implementations, the tracks may have associated metadata. The metadata may be user generated or may be automatically generated. For example, the metadata may include a user generated description of the track such as "sightseeing" or "good shopping". A user may generate the metadata using the track applications 118*a* or 118*b*, for example.

The track server 142 may store the tracks in a global track storage 144. In some implementations, an entry for a track in the global track storage 144 may include each location and temporal identifier associated with the track. In some implementations, users of the track applications 118*a* and 118*b* may also associate metadata or tags with their tracks. The metadata may include a variety of data and data types. For example, the users may associate comments, videos, links, sounds, descriptions, notes, or any other type of data with a track. In addition, the track applications 118*a* and 118*b* may associate their own application specific metadata with the tracks. The metadata may be stored along with the tracks in the global track storage 144.

In some implementations, the tracks may be organized by the track server 142 into what are referred to herein as collections. A collection is an abstract grouping of tracks based on one or more criteria. The criteria may include user names, user groups, metadata, time periods, and/or locations, for example. The criteria may be provided by users of the track clients 116a and 116b and/or the track applications 118a and 118b, or may be provided by the track server 142.

For example, one collection may correspond to some or all tracks of a particular user. Another collection may correspond to tracks of users in a place (e.g., Washington D.C.) at a certain time (e.g., between 7 am and 9 am). Yet another collection may correspond to tracks located within a local mall or other location that are associated with people between the ages of 14 and 18 or other age group or having other common characteristics. Yet another example collection may correspond to tracks in New York that are tagged as "Nightlife". Yet another example collection may correspond to tracks that are located in a particular ski resort. There is no limit to the number, type, or variety of collections that may be supported by the track server 142.

Figure 2:
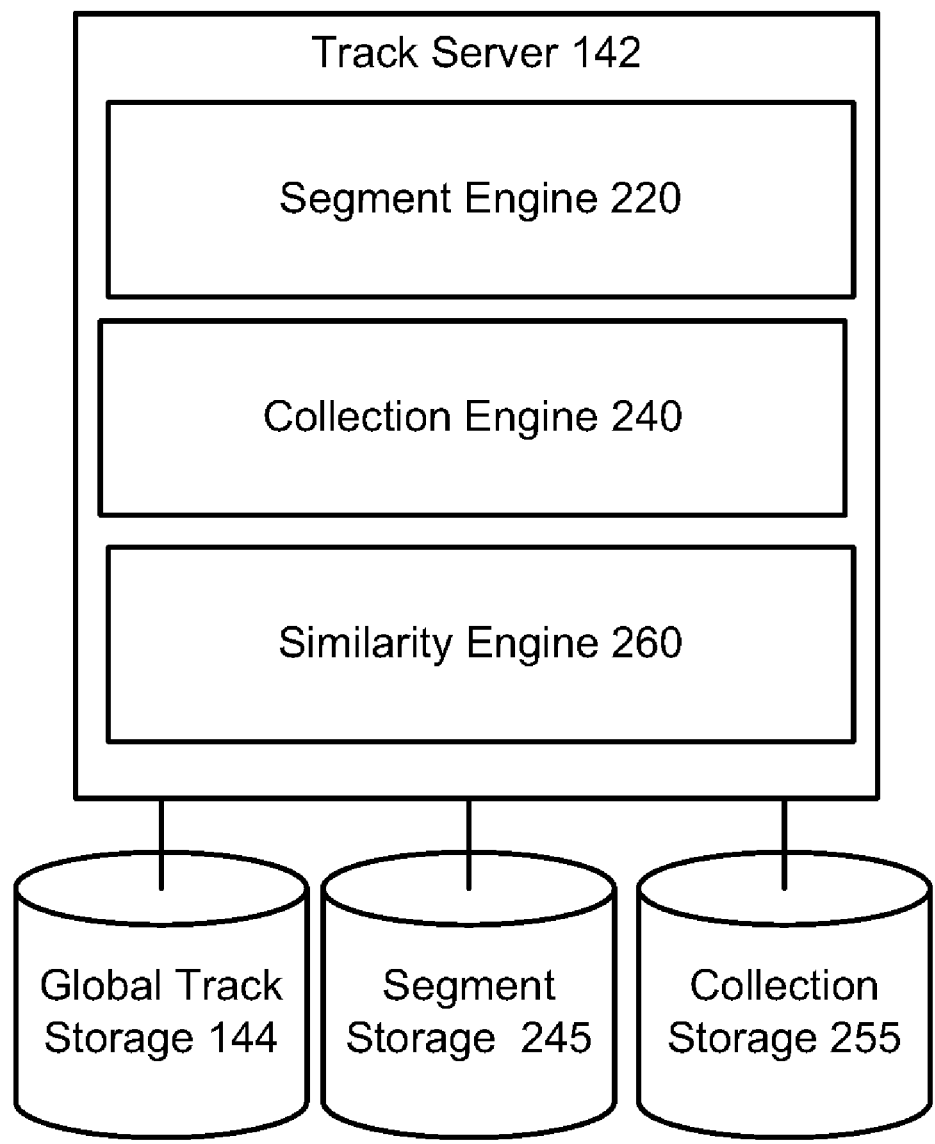
FIG. 2 is an illustration of an example track server.

As described further with respect to FIG. 2, the track server 142 may provide various services and operations for the track applications 118a and 118b using tracks and track collections. In some implementations, the track server 142 may receive an identifier of a track, and identify one or more similar tracks to the identified track in a track collection. In another implementation, the track server 142 may identify similar tracks in a track collection and provide identifiers of the similar tracks. In another implementation, the track server 142 may receive identifiers of a track pair and provide a similarity score for the track pair based on the similarity of the track pair.

FIG. 2 is an illustration of an example track server 142. As illustrated, the track server 142 comprises several components including a segment engine 220, a collection engine 240, and a similarity engine 260. However, the track server 142 may support more or fewer components that those illustrated. The track server 142 may also access data including the global track storage 144 (e.g., illustrated in FIG. 1), segment storage 245, and collection storage 255.

The collection engine 240 may organize the tracks in the global track storage 144 into one or more collections. In some implementations, the collections may be generated on behalf of a user request or a request from the track applications 118a or 118b. For example, a user may request that the collection engine 240 generate a track collection including tracks associated with some or all of their contacts. In another example, a track application 118a directed to car pooling or ride sharing may request that the collection engine 240 generate a collection that includes all of a user's tracks that were generated during a certain time (e.g., between 6 am and 9 am on weekdays). The generated collections may be stored by the collection engine 240 in the collection storage 255.

In some implementations, the collection engine 240 may generate one or more collections from the global track storage 144. For example, the collection engine 240 may automatically generate a collection for each user, city, or user group. Other tags or metadata may also be used to automatically generate a track collection.

The segment engine 220 may identify one or more segments corresponding to tracks in the global track storage 144. Because different tracks may include more or fewer location identifiers, it may difficult to compare tracks to determine similar tracks. For example, a track associated with a user who walks a particular route may have more location identifiers than a track associated with a user who drives the same route because of the polling frequencies of the locators 112 and the differences in velocities.

To facilitate track comparison, the segment engine 220 may standardize the tracks by identifying one or more segments that correspond to each track. The segments may then be used to compare the tracks or to identify similar tracks. For example, in some implementations, the segments may correspond to sections of roads or highways on a map. The segment engine 220 may determine the roads sections that correspond to a track, and associate the determined segments with the track. Because segments are standardized and not dependent on the number of location identifiers associated with a track, two tracks may be more easily compared using segments. Other types of segments may be used. For example, the segments may correspond to aisles in a supermarket, trails in a ski resort, etc.

In some implementations, the segment engine 220 may determine the segments that correspond to a track by placing each location identifier of the track on a map or other representation of the segments. The map or representation may be selected by the segment engine 220 based on the location identifiers of the track. For example, if the track is located in Washington, D.C., the segment engine 220 may place each location identifier on a map of Washington D.C.

The segment engine 220 may determine the segments from the map that connect the placed location identifiers on the map. For example, the segment engine 220 may determine a series of roads of the map that may be traveled to connect the placed location identifiers. The segment engine 220 may determine the series of segments in the order of the temporal identifiers associated with each location identifier. The segment engine 220 may further take into account the direction of traffic, or other ordering, associated with the segments (e.g., one way streets, river flow direction, etc.) when determining the segments that correspond to a track. Because the resolution of each locator 112 used to generate the location identifiers may be different, the segments identified for a track may only be an approximation of the actual route taken when the track was generated. The identified segments for each track may be stored in the segment storage 245 along with an identifier of the track that each segment is associated with.

Figure 3:
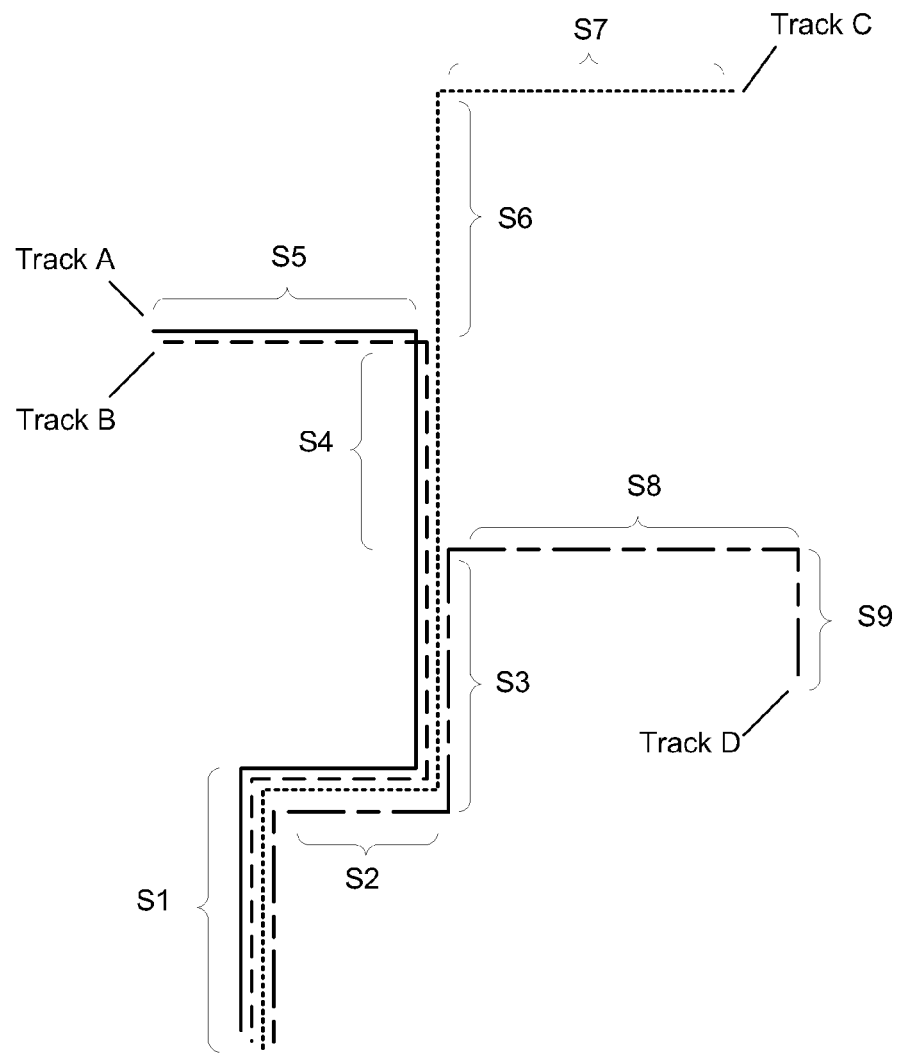
FIG. 3 is an illustration of sample tracks including segments.

For example, FIG. 3 is an illustration of four tracks (i.e., Tracks A-D) and their associated segments in a track collection. Each of the tracks A-D is illustrated using a line having a different line pattern. The segments (i.e., segments S1-S9) corresponding to each of the tracks A-D are also illustrated. The segments S1-S9 may each correspond to a section of road on a map.

As shown, the track A includes segments S5, S4, S3, S2, and S1. The track B is identical to the track A and also includes segments S5, S4, S3, S2, and S1. The track C includes segments S7, S6, S4, S3, S2, and S1. The track D includes segments S9, S8, S3, S2, and S1.

The segment engine 220 may store the segments associated with the tracks from a collection of tracks using a segment data structure. The segment data structure may allow similar tracks to be identified efficiently. In some implementations, the segment engine 220 may generate the segment data structures for a collection by generating a node for each segment associated with a track in the track collection. Each node may further include an identifier of each track that it is associated with.

The segment engine 220 may further generate new nodes from pairs of the generated nodes that have at least one track in common and are associated with adjacent segments, or adjacent sequences of segments, by merging the node pairs. The new node generated for each node pair may include identifiers of each track associated with either of the nodes in the node pair. The new node may be added to the generated nodes as a parent of the nodes in the node pair. Similarly, the pair of nodes may be considered children of the new node.

In some implementations, an indicator of the relative sizes of the segments associated with the child nodes of the new node may be added to the new node. For example, if a new node is a parent of a node A corresponding to a segment that is 5 miles long, and is a parent of a node B corresponding to a segment that is 10 miles long, the parent node may include indicators of 5 miles and 10 miles for each respective child node. The indicators may also be ratios. Continuing the example described above, the ratios may be ⅓ (i.e., 5 miles/15 miles) and ⅔ (i.e., 10 miles/15 miles), respectively.

The segment engine 220 may recursively generate new nodes by merging adjacent node pairs that are associated with a common track and are associated with adjacent segments, or sequences of segments, until no further new nodes may be merged. Where a node is adjacent to more than one other node, the segment engine 220 may select the node pair that appears adjacently in the greatest number of common tracks.

Figure 4:
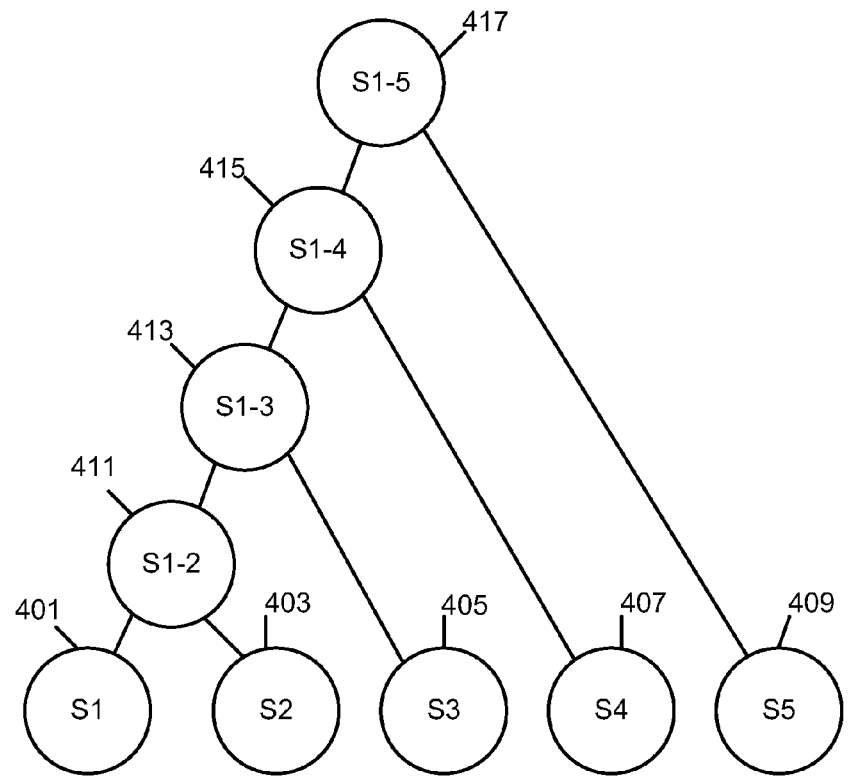
FIG. 4 is an illustration of example data structures representing the tracks illustrated in FIG. 3.
Figure 4:
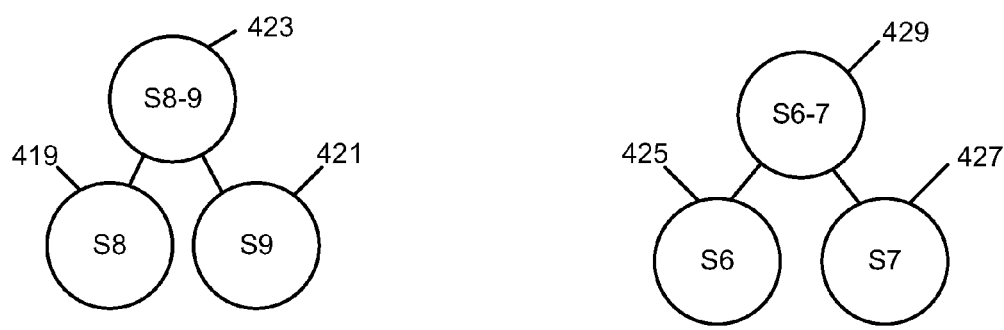

FIG. 4 is an illustration of example segment data structures generated by the segment engine 220 from the segments associated with tracks in a track collection. The tracks in the example track collection correspond to the Tracks A-D illustrated in FIG. 3.

At a first iteration, the segment engine 220 may generate a node corresponding to each segment in the track collection. These nodes are illustrated as nodes 401, 403, 405, 407, 409, 425, 427, 419, and 421, and correspond to segments S1-S9 respectfully. Each node is associated with the track that includes the segment associated with the node. Thus, the node 401 is associated with Tracks A-D, node 403 is associated with Tracks A-D, node 405 is associated with Tracks A-D, node 407 is associated with Tracks A, B, and C, node 409 is associated with Tracks A and B, node 419 is associated with Track D, node 421 is associated with Track D, node 425 is associated with Track C, and node 427 is associated with Track D.

In a subsequent iteration, the segment engine 220 may generate parent nodes for nodes that are associated with adjacent segments, or sequences of segments, and have at least one track in common. Thus, the segment engine 220 may generate the node 411 as a parent node of nodes 401 and 403. The node 411 corresponds to the combined segments S1 and S2. S1 and S2 are adjacent segments and are each associated with tracks A, B, C, and D. The segment engine 220 may further generate the node 423 corresponding to segments S8 and S9, and the node 429 corresponding to segments S6 and S7. Segments S8 and S9 are adjacent and are both associated with Track D. Segments S6 and S7 are adjacent and are both associated with Track C. The node 411 may be associated with Tracks A-D, the node 423 may be associated with Track D, and the node 429 may be associated with Track C.

In further iterations, the node 411 is combined with the node 405 to create the node 413 corresponding to the segments S1, S2, and S3. The node 413 is combined with the node 407 to create the node 415 corresponding to the segments S1, S2, S3, and S4. The node 415 is combined with the node 409 to create the node 417 corresponding to the segments S1, S2, S3, S4, and S5. Each new node may be associated with the tracks associated with its child and descendent nodes as described above.

Because the segment sequence S1-S5 is the largest adjacent sequence of segments that appears in at least two tracks of the collection (i.e., Tracks A and B), the node 417 is the largest node that is created. Similarly, because the segments represented by nodes 423 and 429 only appear in Tracks C and D respectively, they are not merged with any other nodes.

The similarity engine 260 may determine similar tracks in a collection of tracks. In some implementations, the similarity engine 260 may receive an identifier of a track and identify one or more similar tracks in the collection to the identified track. The identified track may be a track in the global track storage 144, or alternatively, may be received from a user of a track application 118a or 118b.

The similarity engine 260 may determine the segments that correspond to the identified track and the segments that correspond to the tracks in the collection from the segment storage 245. The similarity engine 260 may determine tracks from the collection that are similar to the identified track using the determined segments that correspond to the identified track and to the tracks in the collection. For example, the similarity engine 260 may determine the tracks in the collection that share greater than a threshold number of segments, or share greater than a threshold length in segments, as the identified track. The threshold number or length may be selected by the user or the track application 118a or 118b.

In implementations where the tracks are represented using the node based segment data structure described above, the similarity engine 260 may identify child nodes in the collection that are associated with segments of the identified track. The identified nodes may be added to a set of identified nodes. Of the identified nodes in the set of identified nodes, the similarity engine 260 may then determine if any of the identified nodes have a common parent node (i.e., are associated with adjacent segments or sequences of segments). If they do, the parent nodes may replace the child nodes in the set of identified nodes. The similarity engine 260 may iteratively replace node pairs in the set of identified nodes with their parent nodes until no further replacements may be made.

The tracks associated with the nodes in the set of identified nodes may be identified by the similarity engine 260 as the similar tracks. The tracks may be further ranked or scored based on the number of nodes associated with each track, the number of descendents each node associated with a track has, and/or the overall length of each matching segment. As described previously, parent nodes are generated from nodes having adjacent segments or adjacent sequences of segments. Thus, a node with multiple descendents may be associated with a sequence of segments and may be weighted higher than a node associated with a single segment. However, because segments may vary in length, the overall length of the matching segments may also be considered when determining the rank or score of a track. In some implementations, only tracks with a score that is greater than a threshold score may be identified to the user as similar tracks, for example.

The similarity engine 260 may further determine a similarity score of two tracks identified by a user or by a track application 118a or 118b. The similarity of the two tracks may be determined by the similarity engine 260 by determining the length of all of the common segments between the two tracks, and the total length of the union of all the segments of either track. In an implementation, the ratio of the length of the common segments to the length of the union of segments may be returned as the similarity score for the two tracks.

Figure 5:
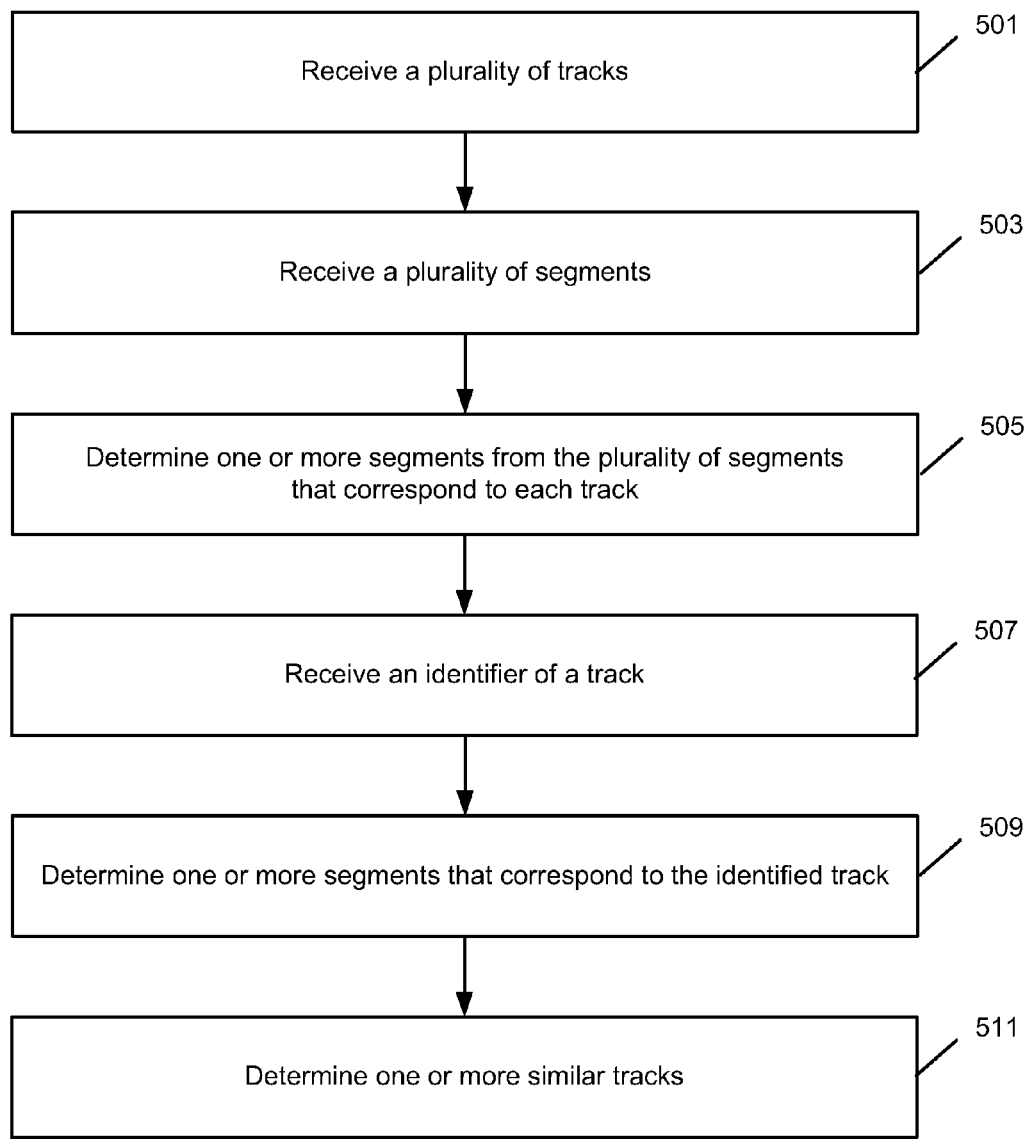
FIG. 5 is an operational flow of an implementation of a method for identifying similar tracks in a track collection.

FIG. 5 is an operational flow of an implementation of a method 500 for identifying similar tracks in a track collection. The method 500 may be performed using the segment engine 220 and the similarity engine 260 of the track server 142, for example.

A plurality of tracks is received at 501. The plurality of tracks may be received by the segment engine 220 of the track server 142. The plurality of tracks may be received from the global track storage 144 and the plurality of tracks may represent a collection of tracks. Each track may include a plurality of location and temporal identifiers. The location identifiers may be GPS coordinates, for example.

A plurality of segments is received at 503. The plurality of segments may be received by the segment engine 220 of the track server 142. The plurality of segments may be part of a map and may correspond to sections of roads or highways on the map, for example. Other maps may be used, for example, the map may be of a shopping mall, a hiking trail, or sailing channels.

One or more segments from the plurality of segments that correspond to each track are determined at 505. The one or more segments may be determined by the segment engine 220 of the track server 142. In some implementations, the segments may be determined for a track by placing each location identifier associated with the track on a map, and determining the sections of road that connect the placed location identifiers on the map. The determined segments may be associated with their respective tracks and stored in the segment storage 245. In some implementations, the segments may be stored using a node based segment data structure such as that described with respect to FIG. 4, for example.

An identifier of a track is received at 507. The identifier of a track may be received by the similarity engine 260 of the track server 142. The track may be received from a user or application such as the track application 118*a* or 118*b*. The identifier of a track may be received from a user who wishes to determine tracks in the collection that are similar to the identified track. One or more segments that correspond to the identified track are determined at 509. The one or more segments may be determined by the segment engine 220.

One or more similar tracks are determined at 511. The one or more similar tracks may be determined based on the one or more segments that correspond to the identified track and the one or more segments that correspond to each of the plurality of tracks by the similarity engine 260. In some implementations, the one or more similar tracks may be determined by determining tracks from the plurality of tracks that have segments in common with the identified track. The determined one or more tracks may be ranked based on the number of similar segments that they have in common with the identified track, or based on the total length of segments that they have in common with the identified track, for example. In some implementations, the similar tracks may be presented to a user in ranked order.

Figure 6:
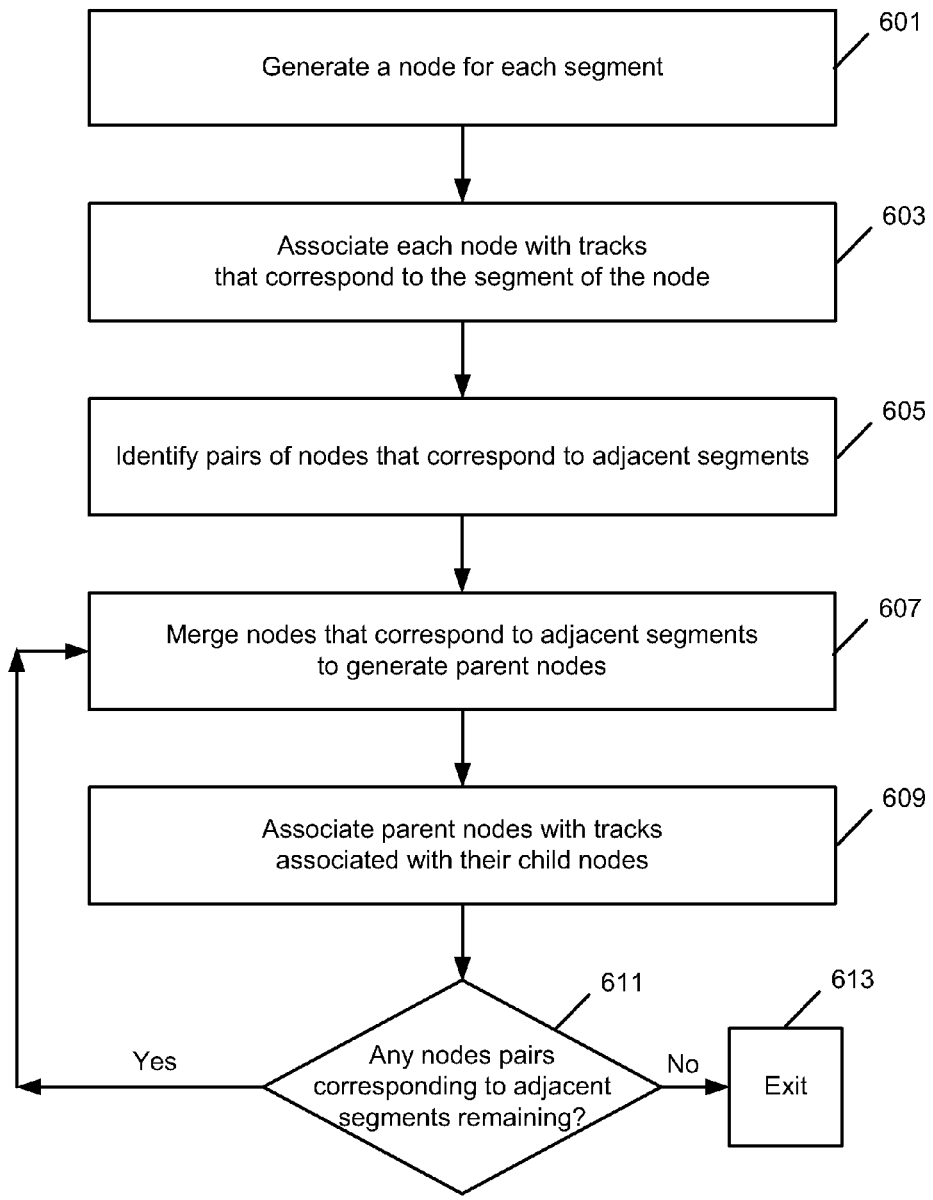
FIG. 6 is an operational flow of an implementation of a method for generating data structures for a track collection.

FIG. 6 is an operational flow of an implementation of a method 600 for generating data structures for a track collection. The method 600 may be implemented using the segment engine 220 of the track server 142, for example.

A node is generated for each segment in a plurality of segments at 601. The node may be generated by the segment engine 220 of the track server 142. Each segment may be associated with one or more tracks from a plurality of tracks in a track collection. Each node is associated with tracks that correspond to the segment associated with the node at 603. Each node may be associated with tracks by the segment engine 220 of the track server 142.

Pairs of nodes that correspond to adjacent segments and have at least one track in common are identified at 605. The pairs of nodes may be identified by the segment engine of the track server 142. In some implementations, the pairs of nodes may also include nodes that correspond to adjacent sequences of segments and have at least one track in common. Where a node can be paired into multiple node pairs, the track server 142 may prefer the node pair that appears adjacently in the greatest number of tracks. For example, the track server 142 may determine a node that is in multiple node pairs, determine the node pair that includes the node that appears in the greatest number of tracks, and remove the node pairs from the identified node pairs that do not appear in the greatest number of tracks.

The pairs of nodes are merged to generate parent nodes at 607. Each pair of nodes may be merged by generating a parent node for the pair of nodes by the segment engine 220 of the track server 142. The pair of nodes comprises child nodes of the generated parent node. The parent nodes are associated with the tracks associated with their child nodes at 609. The parent nodes may be associated with the tracks by the segment engine 220 of the track server 142.

A determination is made as to whether any node pairs that correspond to adjacent segments and that have at least one track in common remain at 611. The determination may be made by the segment engine 220 of the track server 142. The node pairs may include merged nodes (i.e., parent nodes). If node pairs remain, then processing may continue at 607 where the node pairs may be merged. Otherwise, the method 600 may end at 613.

Figure 7:
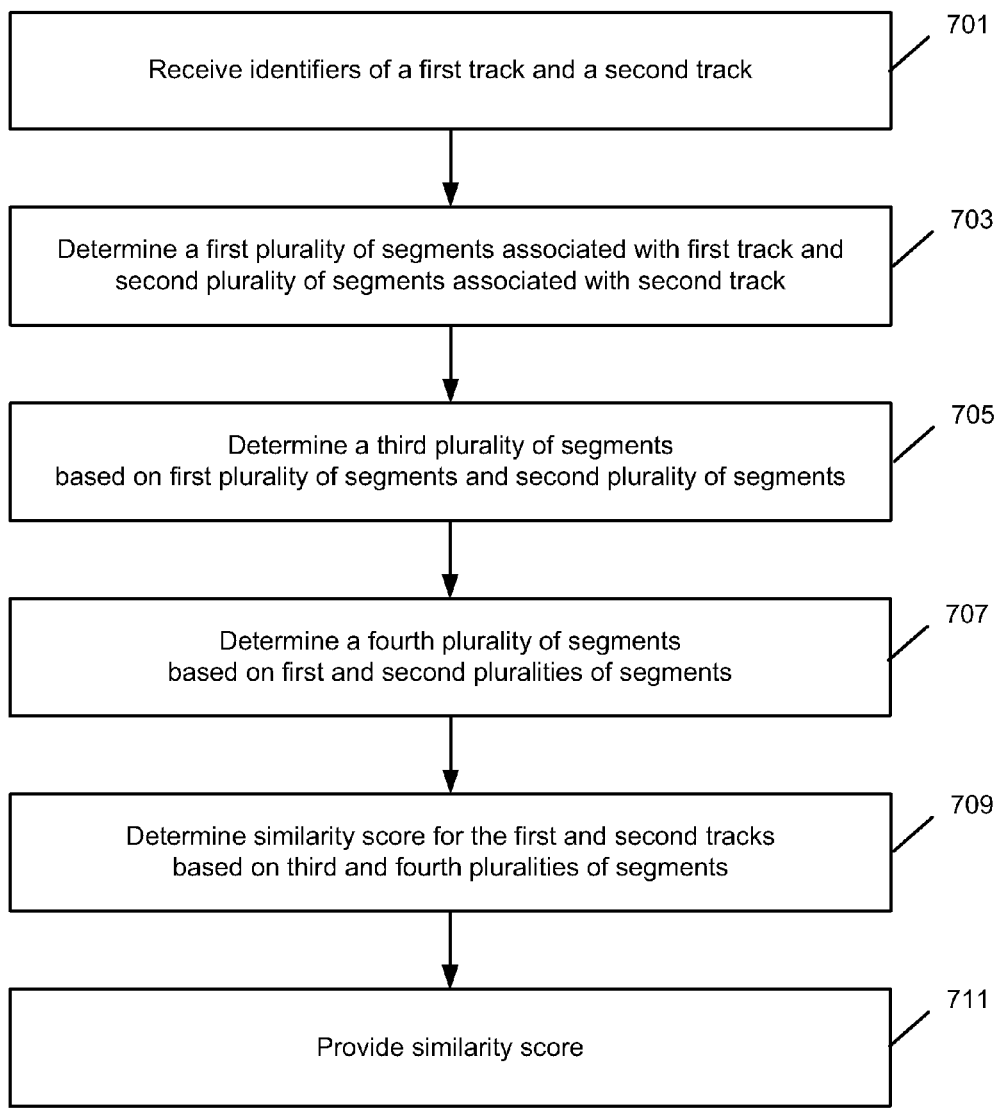
FIG. 7 is an operational flow of an implementation of a method for determining a similarity score for a first track and a second track.

FIG. 7 is an operational flow of an implementation of a method 700 for determining a similarity score for a first track and a second track. The method 700 may be implemented using the similarity engine 260 of the track server 142, for example.

Identifiers of a first track and a second track are received at 701. The identifiers may be received by the similarity engine 260 of the track server 142. The identifiers of the first and second track may be received from a user or a track application 118*a* or 118*b*. For example, a user may wish to receive a similarity score for the first and second tracks.

A first plurality of segments associated with the first track and a second plurality of segments associated with the second track are determined at 703. The first plurality of segments associated with the first track and the second plurality of segments associated with the second track may be determined by the similarity engine 260 of the track server 142 from the segment storage 245. For example, the first and second plurality of segments may have been computed and stored by the segment engine 220.

A third plurality of segments based on the first plurality of segments and the second plurality of segments is determined at 705. The third plurality of segments may be determined by the similarity engine 260 of the track server 142. In some implementations, the third plurality of segments may include segments that are in both the first plurality and second plurality of segments (i.e., the intersection of the first and second plurality of segments).

A fourth plurality of segments based on the first and second pluralities of segments is determined at 707. The fourth plurality of segments may be determined by the similarity engine 260 of the track server 142. In some implementations, the fourth plurality of segments may include segments that are in either the first plurality of segments or the second plurality of segments (i.e., the union of the first and second plurality of segments).

A similarity score for the first and second tracks is determined based on the third and fourth pluralities of segments at 709. The similarity score may be determined by the similarity engine 260 of the track server 142. In some implementations, the similarity score may be the ratio of a total length of the segments in the third plurality of segments to a total length of the segments in the fourth plurality of segments.

The determined similarity score is provided at 711. The similarity score may be provided by the similarity engine of the track server 142. The similarity score may be presented to the user who provided the indicators of the first and second tracks.

Figure 8:
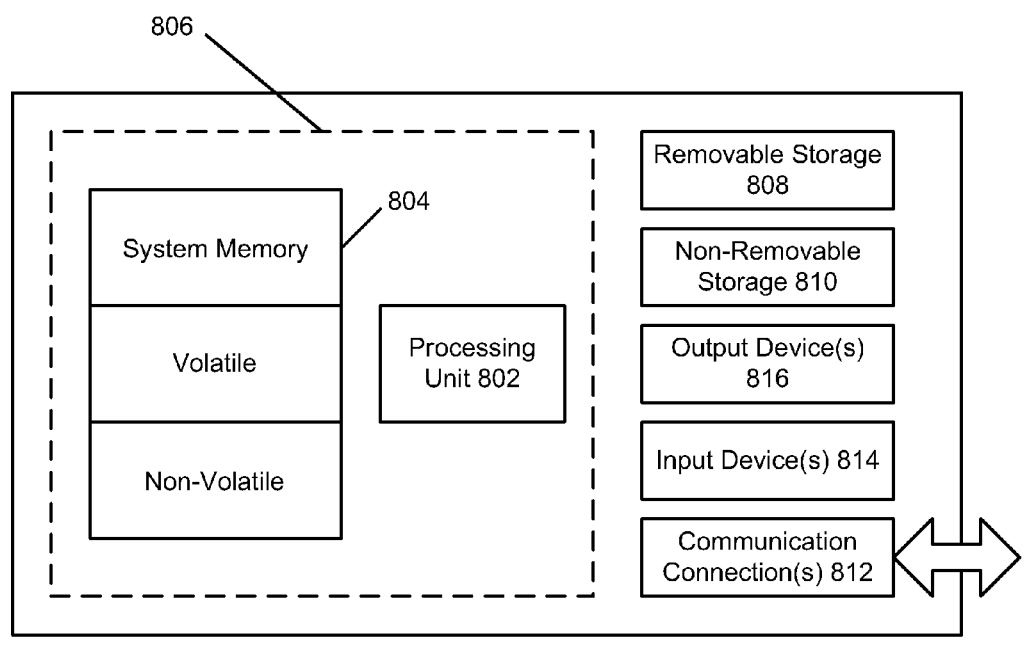
FIG. 8 is a block diagram of a computing system environment according to an implementation of the present system.

FIG. 8 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communications connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving a plurality of tracks by a computing device, wherein each track comprises a plurality of location identifiers;
    receiving a plurality of segments by the computing device;
    for each track in the plurality of tracks, determining one or more segments from the plurality of segments that correspond to the track by the computing device;
    receiving an identifier of a track by the computing device;
    determining one or more segments from the plurality of segments that correspond to the identified track by the computing device;
    determining one or more tracks from the plurality of tracks that are similar to the identified track based on the one or more segments that correspond to the identified track and the one or more segments that correspond to each of the plurality of tracks by the computing device;
    generating a node corresponding to each segment;
    associating each node with the tracks that correspond to the segment of the node;
    identifying pairs of nodes that correspond to adjacent segments; and
    for each identified pair of nodes:
        determining if the pair of nodes is associated with at least one common track, and if so:
            generating a node for the identified pair of nodes, wherein the generated node is a parent of the identified pair of nodes and the identified pair of nodes are children of the generated node; and
            associating the generated node with the tracks associated with the identified pair of nodes;
    identifying a node that is in more than one identified node pair;

determining the node pair that includes the identified node that has the greatest number of associated tracks; and removing at least one node pair from the identified pairs of nodes that includes the identified node that does not have the greatest number of associated tracks.

2. The method of claim 1, wherein each segment corresponds to a section of a road on a map.

3. The method of claim 2, wherein determining one or more segments from the plurality of segments that correspond to the identified track comprises:

placing each location identifier of the identified track on the map; and determining the sections of road that connect the placed location identifiers on the map.

4. The method of claim 1, wherein each track represents a commute.

5. The method of claim 1, wherein the identifier of a track is received from a user and further comprising providing identifiers of the determined one or more tracks to the user.

6. A method comprising:

receiving a plurality of tracks by a computing device, wherein each track comprises a plurality of location identifiers;

receiving a plurality of segments by the computing device;

for each track in the plurality of tracks, determining one or more segments from the plurality of segments that correspond to the track by the computing device;

receiving an identifier of a track by the computing device;

determining one or more segments from the plurality of segments that correspond to the identified track by the computing device;

determining one or more tracks from the plurality of tracks that are similar to the identified track based on the one or more segments that correspond to the identified track and the one or more segments that correspond to each of the plurality of tracks by the computing device:

generating a node corresponding to each segment;

associating each node with the tracks that correspond to the segment of the node;

identifying pairs of nodes that correspond to adjacent segments; and for each identified pair of nodes:

determining if the pair of nodes is associated with at least one common track, and if so:

generating a node for the identified pair of nodes, wherein the generated node is a parent of the identified pair of nodes and the identified pair of nodes are children of the generated node; and associating the generated node with the tracks associated with the identified pair of nodes, wherein determining one or more tracks from the plurality of tracks that are similar to the identified track based on the one or more segments that correspond to the identified track and the one or more segments that correspond to each of the plurality of tracks comprises:

determining nodes that are associated with the identified track;

determining tracks from the plurality of tracks that are associated with the determined nodes;

ranking the determined tracks, wherein a determined track associated with a parent node is ranked higher than a determined track associated with children nodes of the parent node; and selecting tracks that have a determined rank that is greater than a threshold rank as the one or more tracks from the plurality of tracks that are similar to the identified track.

7. A method comprising:

receiving an identifier of a first track and an identifier of a second track by a computing device, wherein the first and second track each comprise a plurality of location identifiers;

determining a first plurality of segments associated with the first track;

determining a second plurality of segments associated with the second track;

determining a third plurality of segments based on the first plurality of segments and the second plurality of segments, wherein the third plurality of segments comprises segments that are in both the first plurality of segments and the second plurality of segments;

determining a fourth plurality of segments based on the first plurality of segments and the second plurality of segments, wherein the fourth plurality of segments comprises segments that are in either the first plurality of segments or the second plurality of segments; and determining a similarity score for the first and second tracks based on the third plurality of segments and the fourth plurality of segments.

8. The method of claim 7, further comprising providing the generated similarity score to a computing device of a user.

9. The method of claim 7, further comprising determining a length of the segments in the third plurality of segments and a length of the segments in the fourth plurality of segments; and wherein determining the similarity score comprises determining a ratio between the length of the segments in the third plurality of segments and the length of the segments in the fourth plurality of segments.

10. The method of claim 7, wherein each segment corresponds to section of a road on a map.

11. The method of claim 7, wherein determining the first plurality of segments associated with the first track comprises:

placing each location identifier of the first track on the map; and determining the sections of road that connect the placed location identifiers on the map.

12. The method of claim 6, wherein each segment corresponds to a section of a road on a map.

13. The method of claim 12, wherein determining one or more segments from the plurality of segments that correspond to the identified track comprises:

placing each location identifier of the identified track on the map; and determining the sections of road that connect the placed location identifiers on the map.

14. The method of claim 6, wherein each track represents a commute.

15. The method of claim 6, wherein the identifier of a track is received from a user and further comprising providing identifiers of the determined one or more tracks to the user.

* * * * *